US011710868B2

(12) United States Patent
Rogers

(10) Patent No.: US 11,710,868 B2
(45) Date of Patent: Jul. 25, 2023

(54) BATTERY PACK AND A METHOD FOR CHARGING AND COOLING THE BATTERY PACK USING AN EXTERNAL COOLING DEVICE

(71) Applicant: TOYOTA MOTOR ENGINEERING & MANUFACTURING NORTH AMERICA, INC., Plano, TX (US)

(72) Inventor: Caleb M. Rogers, Lexington, KY (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 193 days.

(21) Appl. No.: 16/891,967

(22) Filed: Jun. 3, 2020

(65) Prior Publication Data

US 2021/0384564 A1 Dec. 9, 2021

(51) Int. Cl.
*H01M 10/625* (2014.01)
*H01R 13/00* (2006.01)
*B60L 53/30* (2019.01)
*B60L 58/26* (2019.01)
*H01M 10/6552* (2014.01)

(52) U.S. Cl.
CPC ......... *H01M 10/625* (2015.04); *B60L 53/305* (2019.02); *B60L 58/26* (2019.02); *H01M 10/6552* (2015.04); *H01R 13/005* (2013.01)

(58) Field of Classification Search
CPC .............. H01M 10/625; H01M 10/44; H01M 10/613; H01M 10/63; H01R 13/005; B60L 53/305; B60L 58/26
See application file for complete search history.

(56) References Cited

U.S. PATENT DOCUMENTS 8,350,526 B2   1/2013 Dyer et al.
9,527,403 B2  12/2016 Mardall et al.
(Continued)

FOREIGN PATENT DOCUMENTS

CN   107054120 A  *  8/2017  ......... B60H 1/00278
CN   109204064 A  *  1/2019
(Continued)

OTHER PUBLICATIONS

Peng et al., CN 109204064A, Espacenet machine translation, 2019 (Year: 2019).*

*Primary Examiner* — Adam A Arciero
(74) *Attorney, Agent, or Firm* — Oblon, McClelland, Maier & Neustadt, L.L.P.

(57) ABSTRACT

Aspects of the disclosure provide a battery pack and a method for charging the battery pack externally. The battery pack can include a charging port configured to charge the battery pack, a cooling circuit configured to cool the battery pack in a vehicle, and a cooling interface configured to connect the cooling circuit with an external cooling device that is external to the vehicle. The charging port and the cooling interface can be integrated into a charging port assembly, the cooling interface has an inlet port and an outlet port that have high pressure quick disconnect leakless fittings, and the battery pack is configured to be charged externally via the charging port. The battery pack can include a plurality of isolating devices configured to determine whether the cooling circuit is connected to the external cooling device.

8 Claims, 12 Drawing Sheets

(56) References Cited

U.S. PATENT DOCUMENTS

| | | | |
|---|---|---|---|
| 10,259,333 B2 | 4/2019 | Lindholm et al. | |
| 10,340,709 B2 | 7/2019 | Dyer et al. | |
| 2002/0043413 A1* | 4/2002 | Kimishima | H01M 10/4257 |
| | | | 903/903 |
| 2010/0136384 A1* | 6/2010 | Kreiner | H01M 10/482 |
| | | | 429/50 |
| 2013/0207459 A1* | 8/2013 | Schroder | H01M 10/625 |
| | | | 307/10.1 |
| 2017/0088007 A1 | 3/2017 | Melendez et al. | |
| 2017/0297431 A1 | 10/2017 | Epstein et al. | |
| 2019/0047429 A1 | 2/2019 | Torkelson et al. | |
| 2019/0241093 A1 | 8/2019 | Shimauchi et al. | |
| 2020/0083513 A1* | 3/2020 | Lejosne | H01M 50/502 |
| 2021/0221250 A1* | 7/2021 | Hiratsuka | B60L 7/12 |

FOREIGN PATENT DOCUMENTS

| | | | | |
|---|---|---|---|---|
| DE | 102010007975 A1 | 8/2011 | | |
| DE | 102011082565 A1 | 3/2013 | | |
| FR | 2934087 A3 | 1/2010 | | |
| WO | WO-2009029534 A1 * | 3/2009 | | B60K 6/28 |
| WO | WO201930331 A1 | 2/2019 | | |
| WO | WO-2019144205 A1 * | 8/2019 | | B60K 1/04 |

* cited by examiner

BATTERY PACK AND A METHOD FOR CHARGING AND COOLING THE BATTERY PACK USING AN EXTERNAL COOLING DEVICE

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

US20190241093 A1 describes a charging system installed outside an electric vehicle to charge an in-vehicle battery. The charging system includes an external cooling device that cools the in-vehicle battery. The external cooling device includes: the external channel through which an external refrigerant flows; the bypass channel into and through which the internal refrigerant flows; a compressor that compresses the external refrigerant; a condenser that condenses the external refrigerant and releases the heat; an expansion valve that expands the external refrigerant; and a chiller (heat exchanger) that exchanges heat between the external refrigerant and the internal refrigerant.

SUMMARY

According to the present disclosure, a battery pack is provided. The battery pack can include a charging port configured to charge the battery pack, a cooling circuit configured to cool the battery pack in a vehicle, a cooling interface configured to connect the cooling circuit with an external cooling device that is external to the vehicle, and a plurality of isolating devices configured to determine whether the cooling circuit is connected to the external cooling device.

In an embodiment, the charging port and the cooling interface are integrated into a charging port assembly, the cooling interface has an inlet port and an outlet port, the inlet port and the outlet port have high pressure quick disconnect leakless fittings, and the battery pack is configured to be charged externally via the charging port.

In an embodiment, the charging port further comprises a direct current (DC) socket configured to charge the battery pack externally via fast DC charging.

In an embodiment, the plurality of isolating devices includes a first isolation valve, a second isolation valve, a third isolation valve, and a fourth isolation valve. The first isolation valve and the second isolation valve are configured to connect the cooling interface with the cooling circuit or isolate the cooling interface from the cooling circuit. The third isolation valve and the fourth isolation valve are configured to connect the cooling circuit with an internal cooling device that is internal to the vehicle or isolate the cooling circuit from the internal cooling device.

In an embodiment, the battery pack includes multiple battery modules. The cooling circuit includes multiple conduits for the respective multiple battery modules and a plurality of module activation valves. The plurality of module activation valves and a subset of the multiple conduits are configured to cool a subset of the multiple battery modules.

According to the present disclosure, a battery pack is provided. The battery pack can include a first cooling circuit configured to cool the battery pack in a vehicle with an external cooling device that is external to the vehicle, a second cooling circuit configured to cool the battery pack with an internal cooling device of the vehicle, and a charging port including a cooling interface that is configured to connect the first cooling circuit with the external cooling device. The charging port can be configured to charge the battery pack using the external cooling device.

In an embodiment, the charging port further includes a DC socket configured to charge the battery pack externally via fast DC charging, the cooling interface further includes an inlet port and an outlet port, and the inlet port and the outlet port have high pressure quick disconnect leakless fittings.

In an embodiment, the battery pack includes multiple battery modules. The first cooling circuit includes multiple conduits for the respective multiple battery modules and a plurality of module activation valves. The plurality of module activation valves and a subset of the multiple conduits can be configured to cool a subset of the multiple battery modules.

According to an aspect of the present disclosure, a method of charging and cooling a battery pack in a vehicle is provided. The method can include connecting a first interface in an external charging device to a second interface of the battery pack. The second interface can include a second cooling interface to cool the battery pack via an external cooling device in the external charging device and a charging port to charge the battery pack via the external charging device. When charging the battery pack via the external charging device, the method includes circulating coolant in a cooling circuit in the battery pack using the external cooling device. The cooling circuit can be connected to the external cooling device via a first cooling interface in the external cooling device and the second cooling interface. The method includes disconnecting the first interface from the second interface when a charging process is completed.

In an embodiment, the charging port and the second cooling interface are integrated into a charging port assembly. In an example, the second cooling interface has an inlet port and an outlet port that have high pressure quick disconnect leakless fittings.

In an embodiment, the charging port further comprises a direct current (DC) socket configured to charge the battery pack externally via fast DC charging.

In an embodiment, the method includes determining whether a dedicated cooling circuit is available in the battery pack to cool the battery pack via the external cooling device. When the dedicated cooling circuit is determined to be available in the battery pack, the method includes selecting the dedicated cooling circuit to be the cooling circuit. In an example, when the dedicated cooling circuit is determined not to be available in the battery pack and before circulating the coolant in the cooling circuit, the method further includes isolating the cooling circuit from an internal cooling device in the vehicle and connecting the cooling circuit to the second cooling interface by configuring a plurality of isolating devices. When the charging process is completed, the method includes reconnecting the cooling circuit to the internal cooling device and isolating the cooling circuit from the external cooling device by reconfiguring the plurality of isolating devices.

In an embodiment, the battery pack includes multiple battery modules. The cooling circuit includes multiple conduits for the respective multiple battery modules and a plurality of module activation valves. Charging the battery pack includes charging a subset of the multiple battery modules and circulating the coolant includes configuring the plurality of module activation valves to circulate the coolant in a subset of the conduits to cool the subset of the multiple battery modules.

In an embodiment, circulating the coolant in the cooling circuit includes measuring a temperature of the battery pack, determining a flow rate for the coolant based on the temperature, and circulating the coolant at the determined flow rate. In an example, determining the flow rate for the coolant further includes measuring a state of charge (SoC) of the battery pack and determining the flow rate for the coolant based on the temperature and the SoC.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

A vehicle, such as an electric vehicle, can include a battery pack that is rechargeable. The vehicle can be powered by the battery pack. The battery pack can include one or more battery modules. The battery pack can include a charging port (also referred to as a charging socket) configured to charge or recharge the battery pack externally, for example, at a charging station. In some examples, charging the battery pack is time consuming. Fast charging the battery pack (referred to as fast charging) can reduce a charging time, however, can significantly increase a temperature of the battery pack. The battery pack can include one or more cooling circuits configured to cool the battery pack and a cooling interface (referred to as a vehicle cooling interface, an internal cooling interface) configured to connect one of the one or more cooling circuits with an external cooling device that is external to the vehicle. According to the present disclosure, the battery pack can be cooled with the external cooling device when the battery pack is being charged, for example, via fast direct current (DC) charging at a charging station. The vehicle cooling interface can be mated with (or connected to) a cooling interface (referred to as an external cooling interface) of the external cooling device. A coolant can be circulated in the one of the one or more cooling circuits by pump(s) in the external cooling device at a first flow rate larger than a second flow rate when a coolant is circulated in the one of the one or more cooling circuits or another of the one or more cooling circuits by pump(s) in an internal cooling device that is in the vehicle. In an embodiment, the charging port and the internal cooling interface are integrated into a charging port assembly, and thus the charging port assembly is fitted with the internal cooling interface.

Figure 1:
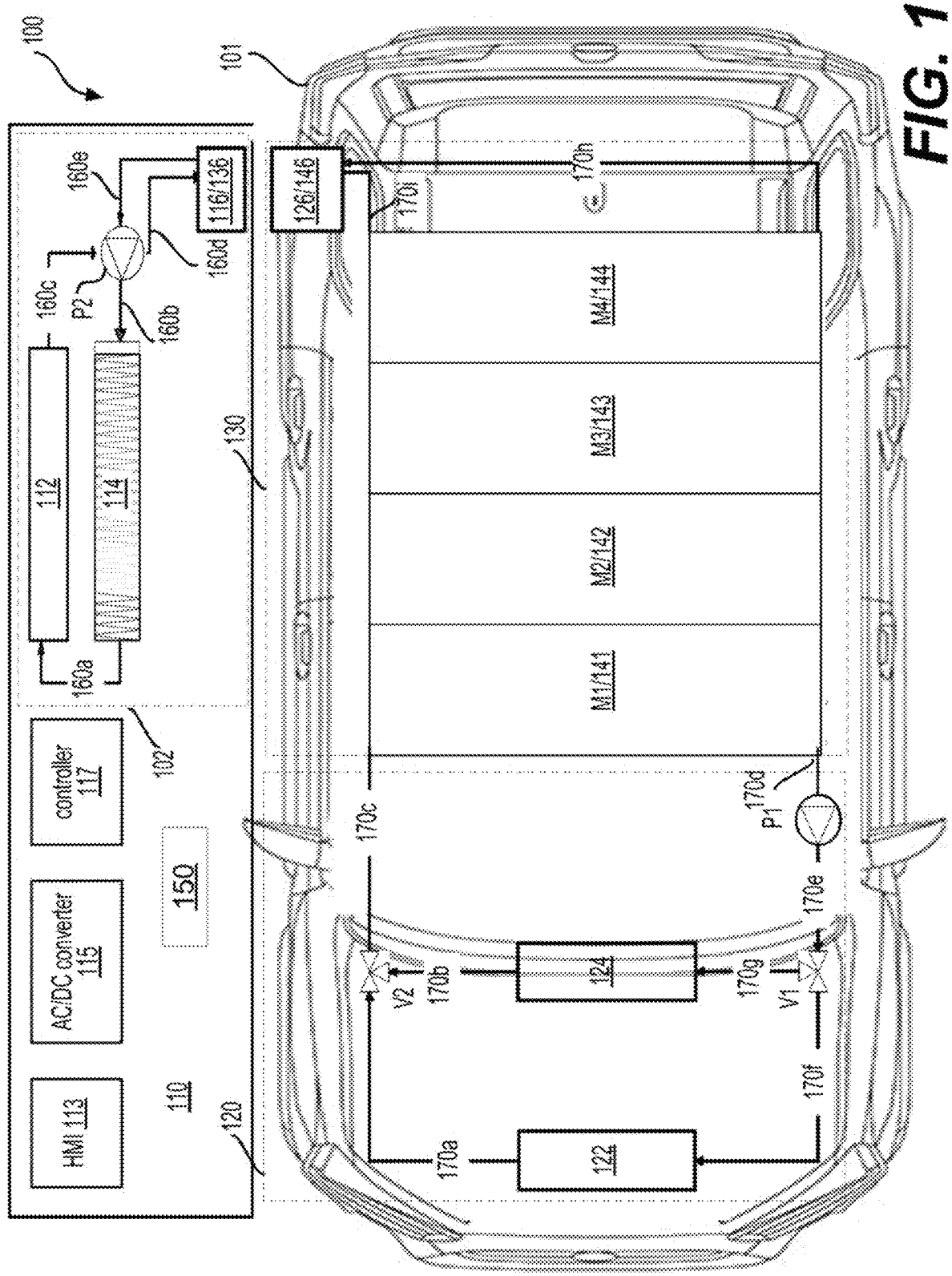
FIG. 1 shows an exemplary system 100 including a battery pack according to the present disclosure.

FIG. 1 shows an exemplary system 100 according to the present disclosure. The system 100 can be configured to charge and/or cool a battery pack 130 in a vehicle 101. An energy source of the vehicle 101 includes at least the battery pack 130. The vehicle 101 can include an electric motor (not shown) for propelling the vehicle 101. The battery pack 130 can provide power to the electric motor. The vehicle 101 can include additional battery pack(s). The additional battery pack(s) can be charged by the system 100. The vehicle 101 can be solely powered by electrical power. The vehicle 101 can be powered by electrical power and other energy sources, such as gasoline, compressed hydrogen, and/or the like. The vehicle 101 can be an all-electric or battery electric vehicle (AEV or BEV), a plug-in electric vehicle, a plug-in hybrid vehicle, a hybrid electric vehicle, or the like.

The system 100 can include an external charging device 110 that is external to the vehicle 101 and the battery pack 130. The external charging device 110 can be located at a charging station. The external charging device 110 can include an external cooling device 102 and a charger 150. The charger 150 is configured to charge the battery pack 130, for example, using an alternating current (AC) or a DC. In an example, the charger 150 can charge the battery pack 130 with a fast DC charging having a high voltage and a high power, and thus reducing a charging time. The charging time to fully charge the battery pack 130 can be reduced to less than a preset time, such as 5 minutes and between 3 to 5 minutes. The external cooling device 102 can be configured to cool the battery pack 130, for example, when the battery pack 130 is being charged by the charger 150.

The external cooling device 102 can include a coolant tank (or a tank) 112 to store a coolant, a heat exchanger 114, a circulation pump (or a pump) P2, a first cooling interface (also referred to as an external cooling interface) 136, and connectors (e.g., connectors 160a-160e) that connect various components in the external cooling device 102, such as the tank 112, the heat exchanger 114, the pump P2, and the first cooling interface 136. The pump P2 can circulate the coolant from the tank 112 to a first one (or a first cooling circuit) of one or more cooling circuits in the battery pack 130. The heat exchanger 114 can remove heat from the coolant returning from the battery pack 130. The external cooling device 102 can include heater(s), additional coolant tank(s), heat exchanger(s), pump(s), and connector(s). The tank 112, the heat exchanger 114, and the pump P2 can be located at any suitable locations in the external cooling device 102 and can be connected in any suitable configuration. The connectors 160a-160e can include conduits, hoses, and/or the like. The connectors 160a-160e can include any suitable materials, such as metal(s). The connectors 160a-160e can be flexible, rigid, and/or the like.

The external charging device 110 can include a human machine interface (HMI) 113, AC/DC converter 115, and a controller (e.g., a programmable logic controller (PLC)) 117 that can control the charger 150 and the external cooling device 102, and thus implementing a charging process that charges and cools the battery pack 130.

The external charging device 110 can include a first interface (or a first charging interface) 116. The first interface 116 can include a plurality of electrical and mechanical connections for charging and cooling/heating the battery pack 130. In an embodiment, the first interface 116 includes a charging plug configured to mate with a charging port in a second interface (or a second charging interface) 126 in the vehicle 101 and the first cooling interface 136 configured to connect to a second cooling interface 146 in the second interface 126. The first interface 116 can include a first communication interface (or an external communication interface) configured to communicate with a second communication interface (or an internal communication interface, vehicle communication interface) in the second interface 126. In an embodiment, the charging plug and the first cooling interface 136 are integrated into a charging plug assembly.

The battery pack 130 can include one or more battery modules (e.g., battery modules M1-M4), the second interface 126, and the one or more cooling circuits configured to cool the battery pack 130. The one or more cooling circuits can include connectors (e.g., connectors 170h-170i). The battery pack 130 can be located in any suitable location of the vehicle 101. The battery pack 130 can include a battery compartment that houses, for example, the battery modules M1-M4, the second interface 126, and the one or more cooling circuits. The battery compartment can be attached to the vehicle 101.

The battery modules M1-M4 can be charged, cooled, heated, and/or removed from the vehicle 101 individually. The battery modules M1-M4 can be connected in any suitable circuit configuration, such as in a parallel circuit to increase amp-hour capacity, in a series circuit to increase a voltage output and thus obtain a desired voltage, or in a series-parallel circuit. The battery modules M1-M4 can be connected using a high voltage module interconnect system.

The battery pack 130 can include a battery having a plurality of battery cells, such as lithium ion cells. Alternatively, the battery modules M1-M4 can include respective battery housings 141-144 and batteries. Each battery can have a plurality of battery cells, such as lithium ion cells. An output voltage of the battery pack or the battery module can be a few hundred volts (V), such as 200 to 800 V. The battery housings 141-144 and the battery compartment can be constructed using any durable material(s), such as metal(s), alloy(s), composite material(s), combination(s) thereof to support and protect the battery from external shocks, such as heat, vibration, crashing, and/or the like. The battery housings 141-144 and the battery compartment can include waterproof and fire retardant material(s), such as aluminum or stainless steel.

The battery compartment and the battery housings 141-144 can include any suitable mechanical and/or electromechanical structures or members configured to secure the battery modules M1-M4 in the battery compartment and to facilitate installation and removal of the battery module into and out of the battery compartment.

The battery pack 130 can include sensor(s), such as temperature sensor(s), voltage sensor(s), and current sensor(s). The battery pack 130 can be controlled by a controller, such as a battery management system (BMS), a battery control module (BCM), a battery management unit (BMU), or an Electronic Control Unit (ECU). The controller can measure and control a temperature of the battery pack 130, monitor and indicate a charging status (or a battery level, a state of charge (SoC)), and monitor and indicate a quality (such as a lifetime) of the battery or the batteries in the battery pack 130. The controller can be located in the battery pack 130, the vehicle 101, or externally in a charging station (e.g., the controller 117). The controller can be distributed in the one or more battery modules (e.g., the battery modules M1-M4), and thus each battery module can be controlled and monitored individually.

The second interface 126 can include a plurality of electrical and mechanical connections for charging and cooling/heating the battery pack 130. The second interface 126 can be located in any suitable location of the battery pack 130, such as on the battery compartment. The second interface 126 can include the charging port and the second cooling interface 146. In an embodiment, the charging port and the second cooling interface 146 are integrated into a charging port assembly. The charging port assembly can be mated to the charging plug assembly of the external charging device 110. The second interface 126 can further include the second communication interface.

In an embodiment, the system 100 includes the external charging device 110 and the battery pack 130 and is referred to as a charging system (or external charging system) 100. The first interface 116 is connected to the second interface 126 as follows: the charging port is mated to the charging plug and the first cooling interface 136 is mated to the second cooling interface 146. Alternatively, the charging port assembly is mated to the charging plug assembly of the external charging device 110. In an example, the first communication interface is connected to the second communication interface via wired or wireless connections. The system 100 is configured to charge the battery pack 130 (e.g., using the charger 150 via the charging plug and the charging port) and cool the battery pack 130 using the external cooling device 102 (e.g., via the first cooling interface 136 and the second cooling interface 146). In an example, the charger 150 charges the battery pack 130 using a fast DC charging to reduce the charging time, and the system 100 including the external charging device 110 and the battery pack 130 is referred to as a fast charging system.

In an embodiment, the first interface 116 is disconnected from the second interface 126. The system 100 includes an internal cooling device (also referred to as onboard cooling device) 120 that is in the vehicle 101, and the internal cooling device 120 is configured to cool/heat the battery pack 130. Accordingly, the system that includes the internal cooling device 120 and the battery pack 130 can be referred to as an internal cooling system. The internal cooling device 120 can include a heat exchanger 122, a heater 124, valves V1-V2, a circulation pump (or a pump) P1, a plurality of connectors (e.g., connectors 170a-170g), a tank (not shown), and/or the like. In an example, the one or more cooling circuits in the battery pack 130 includes the first cooling circuit, and thus the pump P1 circulates a coolant from the tank to the first cooling circuit in the battery pack 130. Accordingly, the first cooling circuit is referred to as a shared cooling circuit, as described below in FIGS. 3A, 3B, and 4. In an example, the one or more cooling circuits in the battery pack 130 includes the first cooling circuit and a second cooling circuit, the pump P1 circulates the coolant from the tank to the second cooling circuit in the battery pack 130. The heat exchanger 122 can remove heat from the coolant returning from the battery pack 130. Alternatively, when a temperature of the battery pack 130 is low (e.g., below a certain threshold or a preset temperature), the heater 124 can heat the coolant and the pump P1 can circulate the heated coolant from the tank to heat the battery pack 130. Accordingly, the first cooling circuit can be referred to as a dedicated cooling circuit that is dedicated to cool the battery pack 130 externally while the second cooling circuit is used to cool/heat the battery pack 130 internally, as described below in FIGS. 5-7.

The valves V1-V2 can be configured to select either the heat exchanger 122 or the heater 124. In an example, the valves V1-V2 are configured to select the heat exchanger 122, and thus route the coolant to the heat exchanger 122 and avoid the heater 124. Accordingly, the battery pack 130 can be cooled. In an example, the valves V1-V2 are configured to select the heater 124, and thus route the coolant to the heater 124 and avoid the heat exchanger 122. Accordingly, the battery pack 130 can be heated.

The internal cooling device 120 can include additional tank(s), heat exchanger(s), heater(s), pump(s), connector(s), valve(s), and/or the like. The heat exchanger 122, the heater 124, the valves V1-V2, and the pump P1 can be located at any suitable locations in the internal cooling device 120 and can be connected in any suitable configuration. The connectors 170a-170g can include conduits, hoses, and/or the like. The connectors 170a-170g can include any suitable materials, such as metal(s). The connectors 170a-170g can be flexible, rigid, and/or the like.

As described above, the system 100 can be configured in various configurations. In an example, the system 100 includes the external charging device 110 and the battery pack 130, and is configured to cool and charge the battery pack 130 and is referred to as the external charging system. In an example, the system 100 includes the internal cooling device 120 and the battery pack 130, and is configured to cool the battery pack 130 and is referred to as the internal cooling system.

Any suitable coolant can be used to cool the battery pack 130 in the system 100. The coolant can be a liquid coolant, such as glycol or poly glycol. The coolant can also be a refrigerant gas that undergoes phase transition during a thermal refrigerant cooling cycle. In some examples, air cooling can be used independently or in combination with the one or more cooling circuits in the battery pack 130.

Figure 2B:
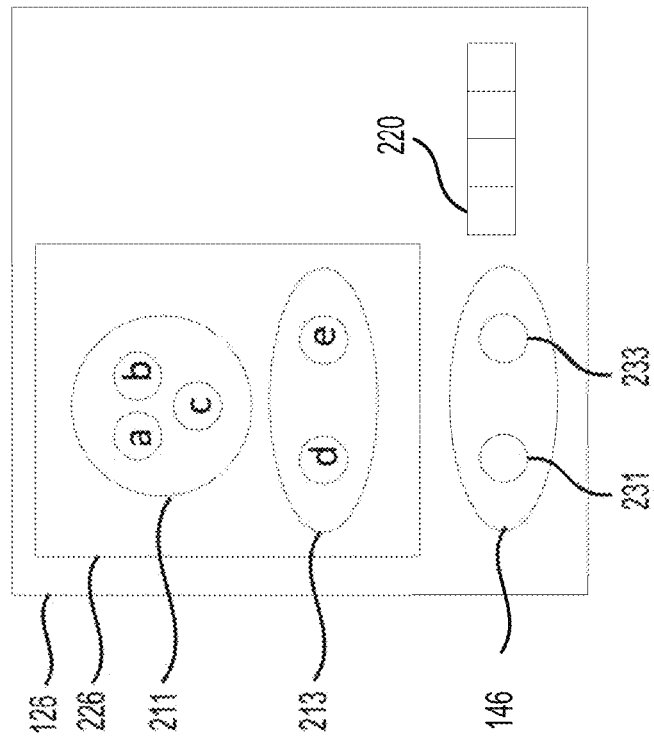
FIGS. 2A-2B show examples of a second interface of the battery pack according to the present disclosure.
Figure 2A:
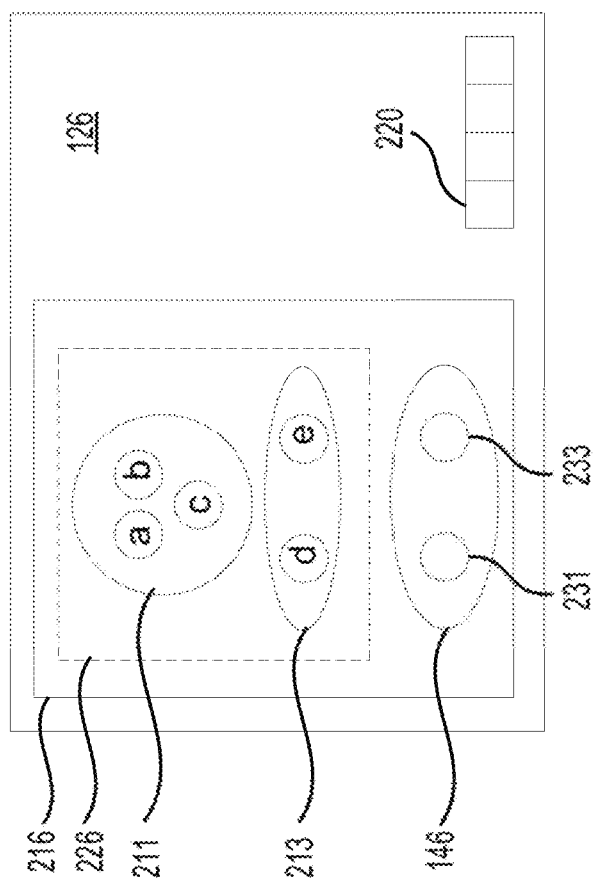

FIGS. 2A-2B show examples of the second interface 126 according to the present disclosure. Referring to FIG. 2A, in an embodiment, the second interface 126 includes a charging port assembly 216 that includes a charging port 226 and the second cooling interface 146. As described with reference to FIG. 1, the charging port 226 and the second cooling interface 146 are integrated into the charging port assembly 216.

The charging port 226 can include a plurality of terminals, such as a terminal for negative line voltage, a terminal for positive line voltage, a terminal for neutral, a terminal for ground, a positive DC terminal, and a negative DC terminal. The plurality of terminals can be configured in a variety of ways to achieve 3-phase AC charging, single phase AC charging, DC fast charging, and/or the like.

The charging port 226 can include any suitable charging port (or charging socket), such as an AC socket, a DC socket, a combination of an AC socket and a DC socket, or the like. In general, an AC socket is configured to charge the battery module using an alternating current, for example, via a single phase or 3-phase. A DC socket is configured to charge the battery module using a direct current, for example, via fast DC charging. Referring to FIG. 2A, the charging port 226 can include an AC socket 211 for 3-phase AC charging and a DC socket 213 for fast DC charging. In an example, the AC socket 211 can include a terminal for negative line voltage a, a terminal for positive line voltage b, and a terminal for neutral c. The DC socket 213 can include a positive DC terminal d and a negative DC terminal e. In an example, a voltage between the positive DC terminal d and the negative DC terminal e is a high voltage, and a charging power for the DC socket 213 is high.

The charging port 226 can be configured to mate with the charging plug in the first interface 116 and charge the battery pack 130, for example, via the AC socket 211, the DC socket 213, or the like. In an example, the charging port 226 is a standard charging socket that can be connected (or mated) to a standard charging plug, such as a Society of Automotive Engineers (SAE) J1772 (also referred to as an IEC Type 1) plug, a Combined Charging System (CCS)1 plug, CCS2 plug, a SAE Combo plug, a CHArge de MOve (CHAdeMO) plug, an International Electrotechnical Commission (IEC) 62196 plug, or the like.

The charging port 226 can include pin(s) for signaling control information and/or battery information. The charging port 226 can also include a terminal, such as a 24 V terminal for battery management functionality during offline charging. The charging port assembly 216 can include additional charging socket(s) based on design considerations for the battery pack 130.

The second cooling interface 146 can include an inlet port 231 and an outlet port 232, allowing the coolant to flow through the battery pack 130, for example, to maintain a suitable temperature when the battery pack 130 is being charged. The inlet port 231 and the outlet port 232 can be connected to the first cooling circuit inside the battery pack 130, for example, via the connectors 170h-170i. The inlet port 231 and the outlet port 232 can be standard ports used for cooling and can be used in different vehicles. Quick disconnect (QD) leakless fittings can be used for the inlet and outlet ports 231-232. In an example, high pressure QD leakless fittings are used for the inlet and outlet ports 231-232. The first cooling interface 136, for example, at a charging station can have QD leakless fittings (e.g., high pressure QD leakless fittings) that are compatible with those of the inlet and outlet ports 231-232. In an example, the charging plug can be fitted with the QD leakless fittings (e.g., high pressure QD leakless fittings), and thus forming a charging plug assembly that is mated with the charging port assembly 216. In an example, the high pressure QD leakless fittings in the first cooling interface 136 and the second cooling interface 146 can enable a faster flow rate of the coolant and thus more efficient heat removal from the battery pack 130 than QD leakless fittings without high pressure capability.

The second cooling interface 146 can be configured to connect to the first cooling interface 136. The first cooling interface 136 and the second cooling interface 146 can be configured to connect the first cooling circuit in the battery pack 130 with the external cooling device 102. The external cooling device 102 can maintain a suitable temperature of the battery pack 130, for example, during fast DC charging. The second cooling interface 146 can be configured to be disconnected, for example, from the first cooling interface 136. Thus, the inlet port 231 and the outlet port 232 can be sealed without leakage.

The second interface 126 can include a second communication interface 220 configured to communicate with the external charging device 110, for example, via the first communication interface, using suitable communication technologies, such as wired, fiber optic communication technologies, and any suitable combination thereof. The second communication interface 220 can send battery pack information that indicates, for example, temperature, voltage, current, battery status, and/or the like to the external charging device 110 (e.g., the controller 117). The second communication interface 220 can be designed with robustness for high connection cycles. In an example, the second communication interface 220 can be conformed to a certain standard or standard configuration, such as common across manufacturers.

In general, the charging port assembly 216 and the second communication interface 220 can be located on any suitable location(s) of the battery pack 130. In an example, the charging port assembly 216 and the second communication interface 220 are located on an external surface of the battery compartment as shown in FIG. 2A and are configured to be mated with the corresponding charging plug assembly and the first communication interface in the external charging device 110.

In an example, the second communication interface 220 uses wireless technologies, such as IEEE 802.15.1 or Bluetooth, IEEE 802.11 or Wi-Fi, mobile network technologies, and the like to communicate with the external charging device 110 (e.g., the controller 117 that is configured to communicate wirelessly). Accordingly, the second communication interface 220 can be located within the battery pack 130. The charging port assembly 216 can be located on an external surface of the battery pack 130 and is configured to be mated with the corresponding charging plug assembly in the external charging device 110.

The charging port 226 and the second cooling interface 146 can be integrated into the charging port assembly 216, as shown in FIG. 2A. Alternatively, the charging port 226 and the second cooling interface 146 can remain separate, as shown in FIG. 2B. Referring to FIG. 2B, the charging port 226 and the second cooling interface 146 can be located at any suitable locations in the battery pack 130. In an example, the charging port 226 and the second cooling interface 146 are located on an external surface of the battery compartment as shown in FIG. 2B. In an example, the charging port 226 and the second cooling interface 146 are located on two external surfaces of the battery compartment. The detailed descriptions of the charging port 226, the second cooling interface 146, and the second communication interface 220 are similar or identical to those in FIG. 2A, and thus are omitted for purposes of brevity.

As described above, the battery pack 130 can be cooled with the external cooling device 102 when the battery pack 130 is being charged, for example, at a charging station using fast DC charging. The second cooling interface 146 can be mated with (or connected to) the first cooling interface 136 of the external cooling device 102. Accordingly, the first cooling circuit in the battery pack 130, the heater exchanger 114, the tank 112, and the pump P2 can be connected into a combined cooling circuit where the coolant can be circulated by the pump P2 to cool the battery pack 130.

Various embodiments can be used to cool the battery pack 130 using the external cooling device 102. In an embodiment, the first cooling circuit in the battery pack 130 is the shared cooling circuit. The shared cooling circuit can be shared between charging and using the battery pack 130. The shared cooling circuit can be shared between the external cooling device 102 and the internal cooling device 120. The first cooling circuit can be connected to the external cooling device 102 and used to cool the battery pack 130 externally, for example, when the battery pack 130 is being charged (e.g., DC charging, fast DC charging, AC charging). The first cooling circuit can also be connected to the internal cooling device 120 and used to cool or heat the battery pack 130 using the internal cooling device 120, for example, when the battery pack 130 is configured to provide energy to the vehicle 101 (e.g., during operation of the vehicle 101).

Figure 3A:
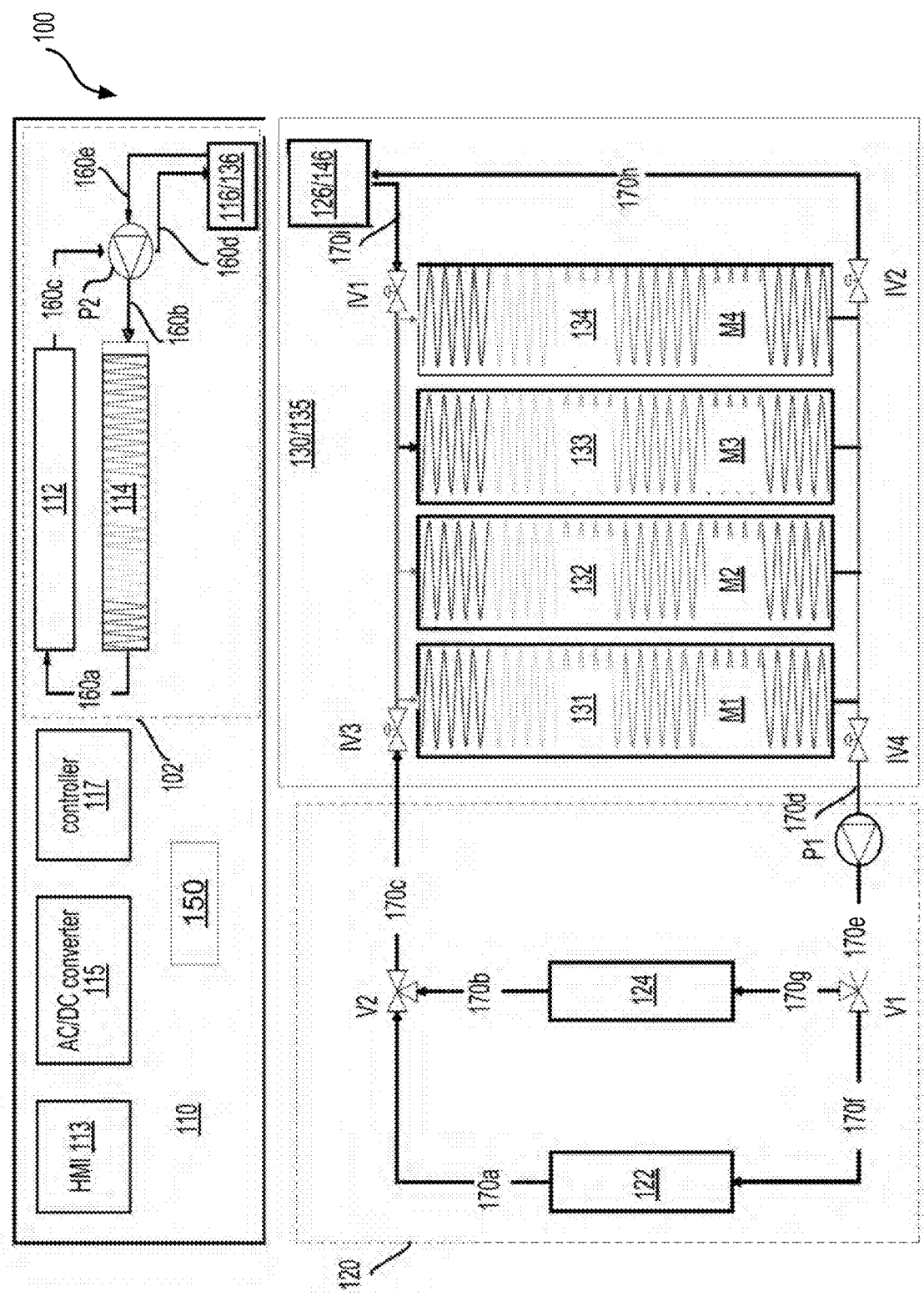
FIGS. 3A, 3B, and 4 show examples of the system 100 where the battery pack includes a shared cooling circuit 135 according to the present disclosure.
Figure 3B:
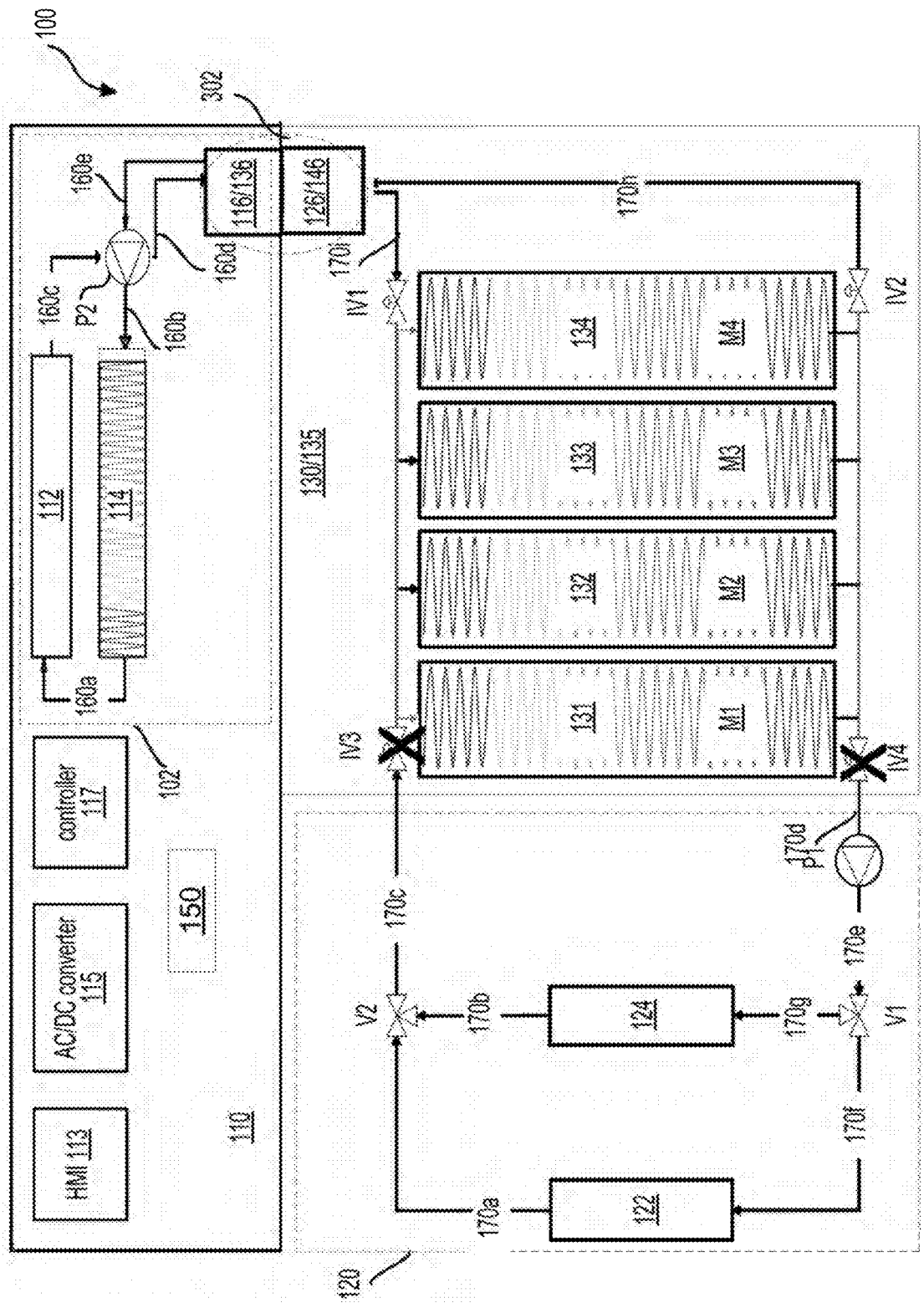

FIGS. 3A-3B show examples of the system 100 where the battery pack 130 includes the shared cooling circuit (or the first cooling circuit) 135 according to the present disclosure. The external charging device 110 and associated components, the internal cooling device 120 and associated components, and the second interface 126 and associated components in FIGS. 3A-3B are identical to those described with reference to FIGS. 1-2, and thus detailed descriptions are omitted for purposes of brevity. As described above, the internal cooling device 120 and the battery pack 130 can be in the vehicle 101. The vehicle 101 is omitted in FIGS. 3A-3B and 4-7 for purposes of clarity.

Referring to FIG. 3A, the battery pack 130 includes the battery modules M1-M4 and the first cooling circuit 135. The first cooling circuit 135 can include a plurality of isolating devices (e.g., IV1-IV4). The battery modules M1-M4 are identical to those described with reference to FIG. 1, and thus detailed descriptions are omitted for purposes of brevity.

The first cooling circuit 135 can include one or more conduits, such as conduits 131-134 for the battery modules M1-M4, respectively. The one or more conduits can be arranged in any suitable configuration to cool the battery pack 130 or a subset of the battery modules M1-M4 in the battery pack 130. For example, the conduits 131-134 are arranged in parallel as shown in FIG. 3A to cool the battery modules M1-M4. The isolating devices IV1-IV4 can be configured to determine whether the first cooling circuit 135 is connected to the external cooling device 102 or the internal cooling device 120.

As described above with reference to FIG. 2A, the charging port 226 and the second cooling interface 146 can be integrated into the charging port assembly 116 in the second interface 126. Alternatively, as described above with reference to FIG. 28, the charging port 226 and the second cooling interface 146 are separated. The second cooling interface 146 can include the inlet port 231 and the outlet port 232 having QD leakless fittings (e.g., high pressure QD leakless fittings). The battery pack 130 can be configured to be charged externally via the charging port 226. In an example, the charging port 226 further includes the DC socket 213 configured to charge the battery pack 130 externally via DC charging (e.g., fast DC charging).

In an example, the plurality of isolating devices (e.g., IV1-IV4) includes a first isolation valve IV1, a second isolation valve IV2, a third isolation valve IV3, and a fourth isolation valve IV4. The first isolation valve IV1 and the second isolation valve IV2 can be configured to connect the second cooling interface 146 with the first cooling circuit 135 via the connectors 170h-170i. The first isolation valve IV1 and the second isolation valve IV2 can also be configured to isolate the second cooling interface 146 from the first cooling circuit 135. The third isolation valve IV3 and the fourth isolation valve IV4 can be configured to connect the first cooling circuit 135 with the internal cooling device 120 in the vehicle 101. The third isolation valve IV3 and the fourth isolation valve IV4 can also be configured to isolate the first cooling circuit 135 from the internal cooling device 120.

In an embodiment, each of the plurality of isolating devices (e.g., IV1-IV4) can be in one of two states: an open state that allows the coolant to pass through the respective isolating device and a closed state that blocks the coolant from passing through the respective isolating device.

Referring to FIG. 3B, the first isolation valve IV1 and the second isolation valve IV2 are configured to be in the open state, and thus can connect the second cooling interface 146 with the first cooling circuit 135 via the connectors 170h-170i. The third isolation valve IV3 and the fourth isolation valve IV4 are configured to be in the closed state (marked by labels 'X'), and thus can isolate the first cooling circuit 135 from the internal cooling device 120. Accordingly, the first cooling circuit 135 is configured to be connected to the external cooling device 102 and to be disconnected from the internal cooling device 102. Further, the first cooling interface 136 is mated to the second cooling interface 146, and the charging plug is mated to the charging port 226 (e.g., the DC socket 213), as indicated by a label 302. Therefore, the battery pack 130 can be charged externally using the external charging device 120 via the charging port 226 and the charging plug, for example, using fast DC charging. The battery pack 130 can be cooled using the external cooling device 102 via the first cooling interface 136 and the second cooling interface 146. For example, the pump P2 circulates the coolant from the tank 112 to the first cooling circuit 135. The heat exchanger 114 removes heat from the coolant returning from the battery pack 130. In an example, the system 100 includes the external charging device 110 and the battery pack 130 where the battery pack 130 includes the shared cooling circuit 135, and thus the system 100 is referred to as the external charging system (e.g., the fast charging system when fast DC charging is implemented) and the battery pack 130 is cooled using the shared cooling circuit 135.

When the battery pack 130 includes multiple battery modules, such as the battery modules M1-M4, a subset (e.g., M1, M1 and M2, M1 and M3, or the like) of the multiple battery modules can be cooled. For example, the first cooling circuit 135 further includes a plurality of module activation valves (e.g., module activation valves 811-816 in FIGS. 8-10), the plurality of module activation valves and a subset of the conduits can be configured to cool the subset of the multiple battery modules, as described below with reference to FIGS. 8-10.

Figure 4:
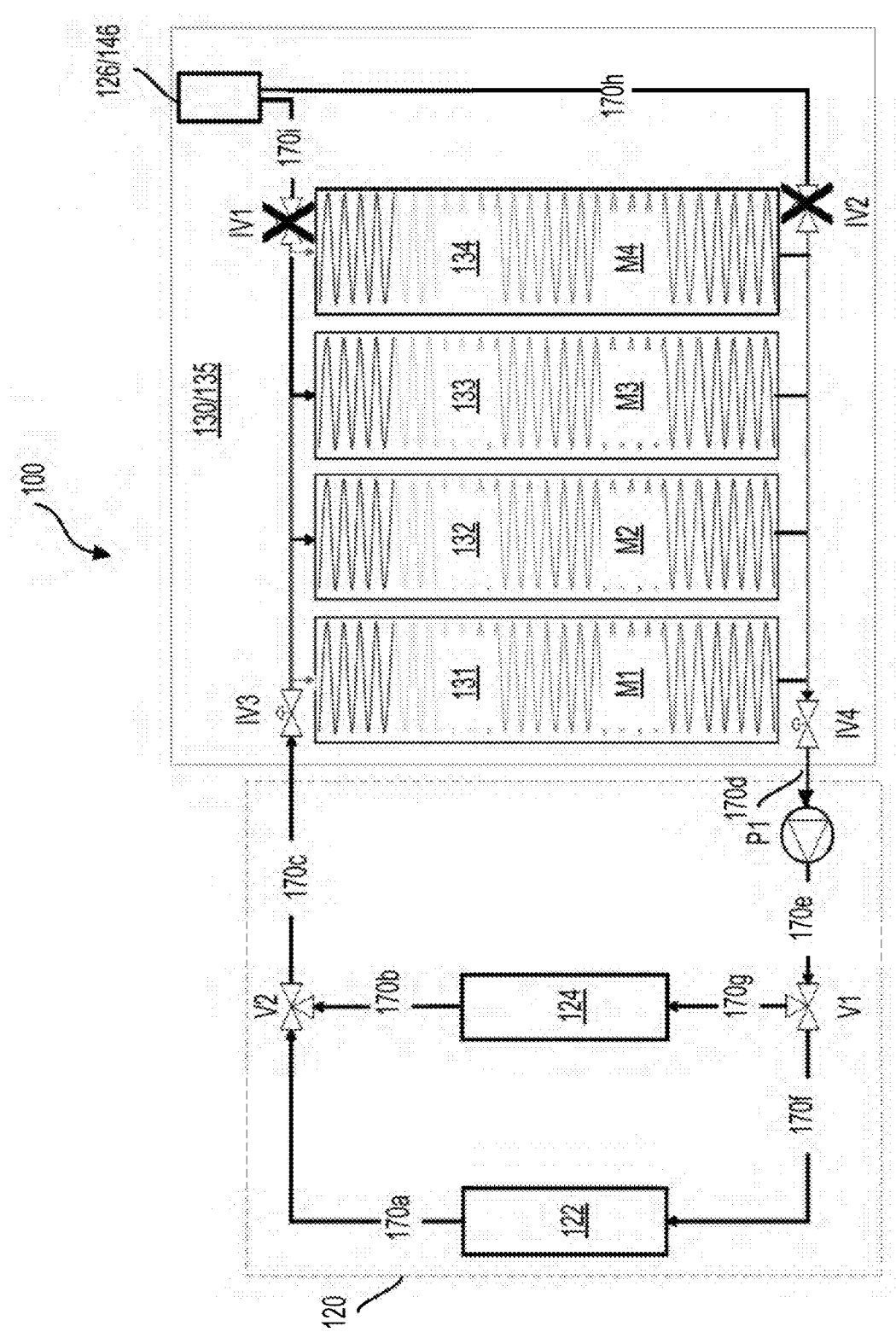

Referring to FIG. 4, the first isolation valve IV1 and the second isolation valve IV2 are configured to be in the closed state (marked by labels 'X'), and thus are configured to isolate the second cooling interface 146 from the first cooling circuit 135. The third isolation valve IV3 and the fourth isolation valve IV4 are configured to be in the open state, and thus are configured to connect the first cooling circuit 135 to the internal cooling device 120. Accordingly, the first cooling circuit 135 is configured to be connected to the internal cooling device 120 and to be disconnected from the external cooling device 102. Further, the first cooling interface 136 is isolated from the second cooling interface 146, and the charging plug is isolated from the charging port 226. Therefore, the battery pack 130 is not being charged externally using the external charging device 120. In an example, the battery pack 130 provides energy to the vehicle 101 during normal operation.

The pump P1 can circulate the coolant from the tank in the internal cooling device 120 to the first cooling circuit 135. The battery pack 130 can be cooled or heated using the internal cooling device 120 depending on configurations of the valves V1-V2. In an example, the valves V1-V2 are configured to select the heat exchanger 122, and thus route the coolant to the heat exchanger 122 and avoid the heater 124. Accordingly, the heat exchanger 122 can remove heat from the coolant returning from the battery pack 130, and thus the battery pack 130 can be cooled. In an example, the valves V1-V2 are configured to select the heater 124, and thus route the coolant to the heater 124 and avoid the heat exchanger 122. Accordingly, the heater 124 can heat the coolant, and thus the battery pack 130 can be heated.

Figure 5:
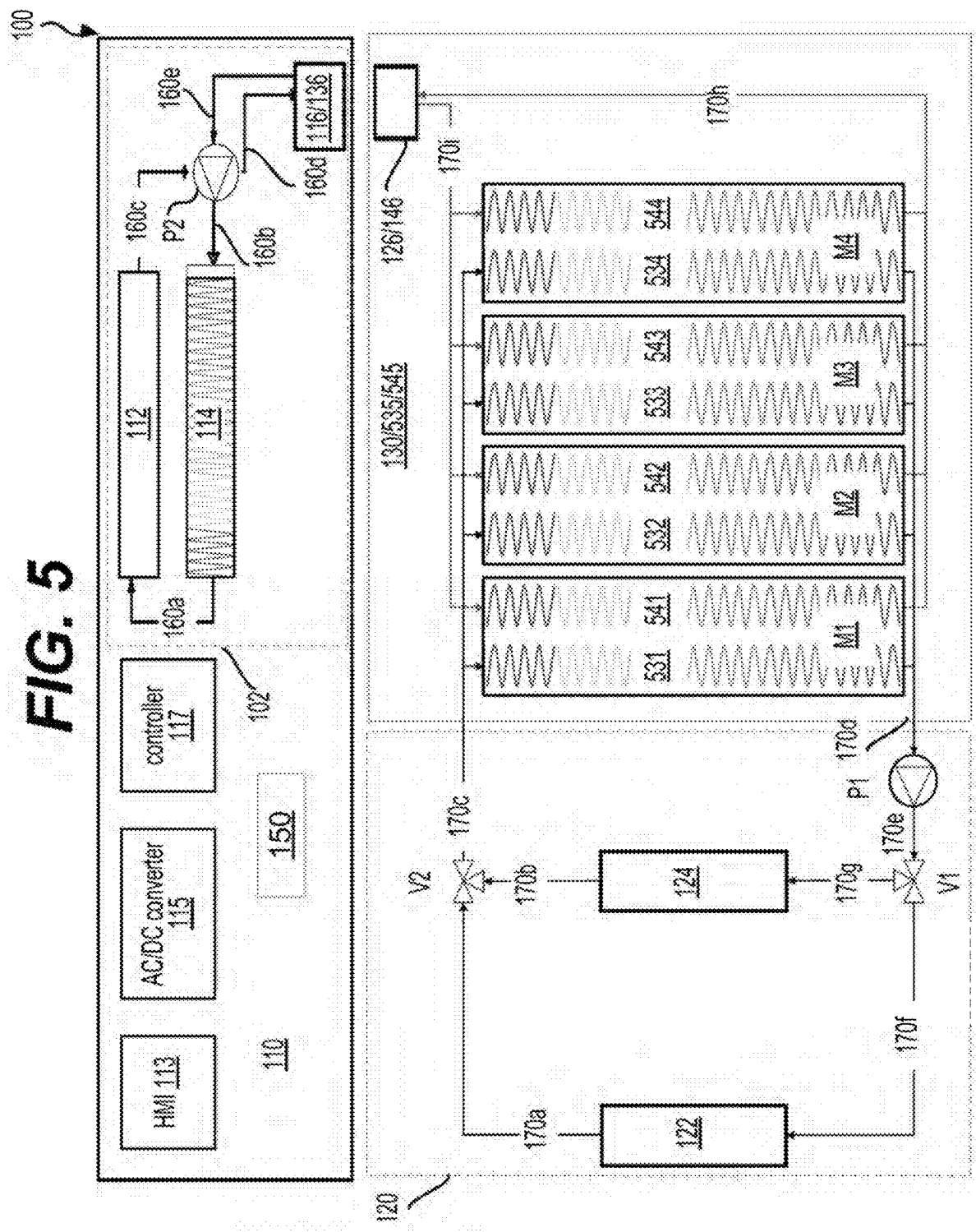
FIGS. 5-7 show examples of the system 100 where the battery pack includes a dedicated cooling circuit 545 for external cooling according to the present disclosure.

As described above, the one or more cooling circuits in the battery pack 130 can include two separate cooling circuits, such as the first cooling circuit (or the dedicated cooling circuit) and the second cooling circuit. Referring to FIGS. 1 and 5, the two separate cooling circuits 535 and 545 include the first cooling circuit 545 and the second cooling circuit 535. The cooling circuits 535 and 545 are physically isolated. The first cooling circuit 545 is connected to the second cooling interface 146, for example, via the connectors 170h-170i, and is disconnected (or physically isolated) from the internal cooling device 102. The first cooling circuit 545 can be connected to the external cooling device 102 and used to cool the battery pack 130 externally, for example, when the battery pack 130 is being charged (e.g., DC charging, fast DC charging). The second cooling circuit 535 is connected to the internal cooling device 120, for example, via the valve V2 and the pump P1, and is disconnected (or physically isolated) from the external cooling device 102. Instead of P1 and V2, the second cooling circuit 535 can be connected to the internal cooling device 120 via different components. The second cooling circuit 535 can be used to cool or heat the battery pack 130 using the internal cooling device 120, for example, when the battery pack 130 is being used to provide energy to the vehicle 101 (e.g., during operation of the vehicle 101).

Comparing FIGS. 3A and 5, the first cooling circuit 135 in FIG. 3A is configured to either connect to the external cooling device 102 and cool the battery pack 130 externally or connect to the internal cooling device 120 and cool the battery pack 130 internally. On the other hand, in FIG. 5, the first cooling circuit 545 is configured to connect to the external cooling device 102 and cool the battery pack 130 externally, and the second cooling circuit 535 is configured to connect to the internal cooling device 120 and cool the battery pack 130 internally. Thus, the first cooling circuit 135 is referred to as the shared cooling circuit 135, and the first cooling circuit 545 is referred to as the dedicated cooling circuit 545 that is dedicated to connect to the external cooling device 102 and cool the battery pack 130 externally.

The second cooling circuit 535 can include one or more conduits, such as conduits 531-534 for the battery modules M1-M4, respectively. The one or more conduits can be arranged in any suitable configuration to cool the battery pack 130 or a subset of the battery modules M1-M4 in the battery pack 130. For example, the conduits 531-534 are arranged in parallel as shown in FIG. 5 to cool the battery modules M1-M4. Similarly, the first cooling circuit 545 can include one or more conduits, such as conduits 541-544 for the battery modules M1-M4, respectively. The one or more conduits can be arranged in any suitable configuration to cool the battery pack 130 or a subset of the battery modules M1-M4 in the battery pack 130. For example, the conduits 541-544 are arranged in parallel as shown in FIG. 5 to cool the battery modules M1-M4.

In an example shown in FIG. 5, the conduits 531-534 in the second cooling circuit 535 are positioned next to the respective conduits 541-544 in the first cooling circuit 545. In generally, the second cooling circuit 535 can be positioned with respect to the first cooling circuit 545 in any suitable configuration and are physically isolated. For example, the conduits 531-534 are interleaved in the conduits 541-544.

Figure 6:
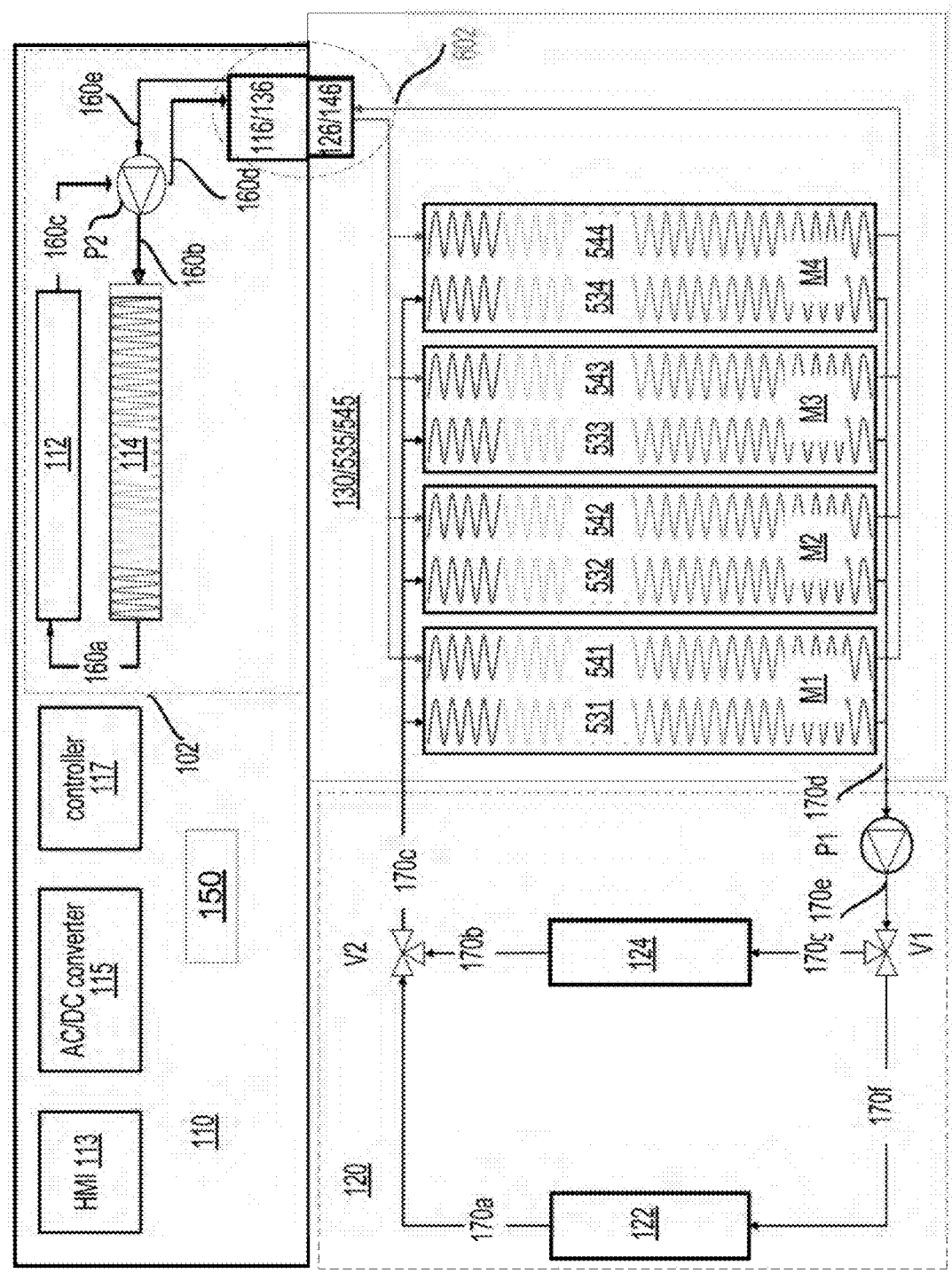

The external charging device 110 and associated components, the internal cooling device 120 and associated components, and the second interface 126 and associated components in FIGS. 5-6 are identical to those described with reference to FIGS. 1-2, and thus detailed descriptions are omitted for purposes of brevity.

Referring to FIG. 5, the battery pack 130 includes the battery modules M1-M4 and the two separate cooling circuits 535 and 545. The battery modules M1-M4 are identical to those described with reference to FIG. 1, and thus detailed descriptions are omitted for purposes of brevity.

As described above with reference to FIG. 2A, the charging port 226 and the second cooling interface 146 can be integrated into the charging port assembly 216 in the second interface 126. Alternatively, as described above with reference to FIG. 2B, the charging port 226 and the second cooling interface 146 are separated. The second cooling interface 146 can include the inlet port 231 and the outlet port 232 having QD leakless fittings (e.g., high pressure QD leakless fittings). The battery pack 130 can be configured to be charged externally via the charging port 226. In an example, the charging port 226 further includes the DC socket 213 configured to charge the battery pack 130 externally via DC charging (e.g., fast DC charging).

Referring to FIG. 6, the first cooling circuit 545 can be connected to the external cooling device 102 by connecting the first cooling interface 136 to the second cooling interface 146, as marked by a label 602. Therefore, the battery pack 130 can be cooled externally using the external cooling device 102, for example, when the battery pack 130 is being charged externally using the charger 150. In an example, the system 100 includes the external charging device 110 and the battery pack 130 where the battery pack 130 includes the dedicated cooling circuit 545, and thus the system 100 is referred to as the external charging system (e.g., the fast charging system when fast DC charging is implemented) and the battery pack 130 is cooled using the dedicated cooling circuit 545.

In an example, the internal cooling device 120 is not in operation (e.g., the pump P1 is off) when the battery pack 130 is cooled externally using the external cooling device 102, and thus saving energy of the battery pack 130. Alternatively, the internal cooling device 120 can be in operation (e.g., the pump P1 is on) and cool the battery pack 130 when the battery pack 130 is cooled externally using the external cooling device 102, and thus cooling the battery pack 130 faster.

The charging plug can be mated to the charging port 226 (e.g., the DC socket 213). Therefore, the battery pack 130 can be charged externally using the external charging device 120 via the charging port 226 and the charging plug, for example, using fast DC charging. The battery pack 130 can be cooled using the external cooling device 102 via the first cooling interface 136 and the second cooling interface 146. For example, the pump P2 circulates the coolant from the tank 112 to the first cooling circuit 545. The heat exchanger 114 removes heat from the coolant returning from the battery pack 130.

In an embodiment, the battery pack 130 includes multiple battery modules, such as the battery modules M1-M4, a subset (e.g., M1, M1 and M2, M1 and M3, or the like) of the multiple battery modules can be cooled. For example, the first cooling circuit 545 further includes a plurality of module activation valves, the plurality of module activation valves and a subset of the conduits can be configured to cool the subset of the multiple battery modules, as described below with reference to FIGS. 8-10.

Figure 7:
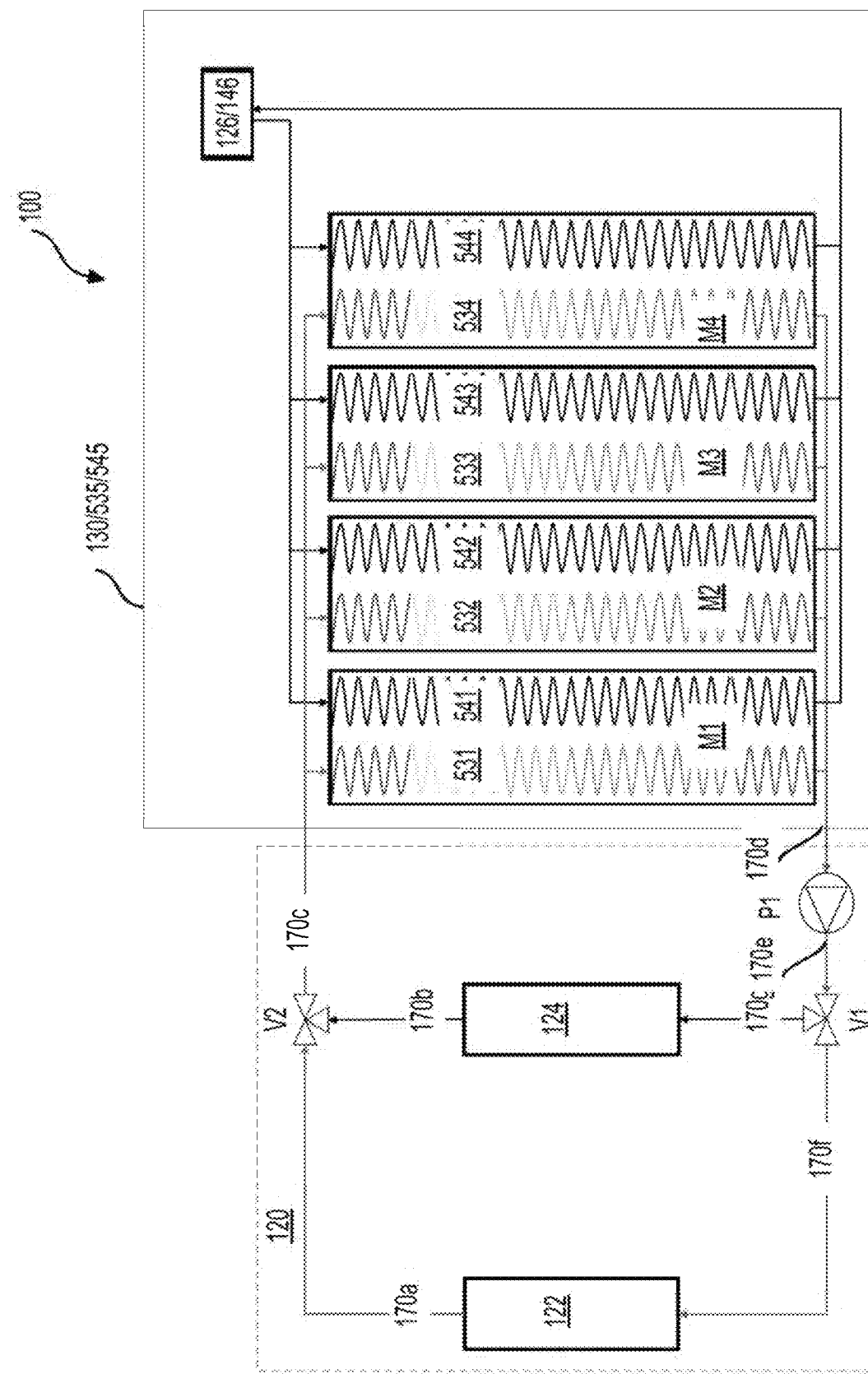

Referring to FIG. 7, the second cooling interface 146 is isolated from the first cooling interface 136, and thus the first cooling circuit 545 is isolated from the external cooling device 102. The charging plug is isolated from the charging port 226. Therefore, the battery pack 130 is not being charged externally using the external charging device 120.

The first cooling circuit 535 is connected to the internal cooling device 120. In an example, the battery pack 130 provides energy to the vehicle 101 during normal operation. The battery pack 130 can be cooled or heated using the internal cooling device 120 depending on configurations of the valves V1-V2, as described in FIG. 4.

Figure 8:
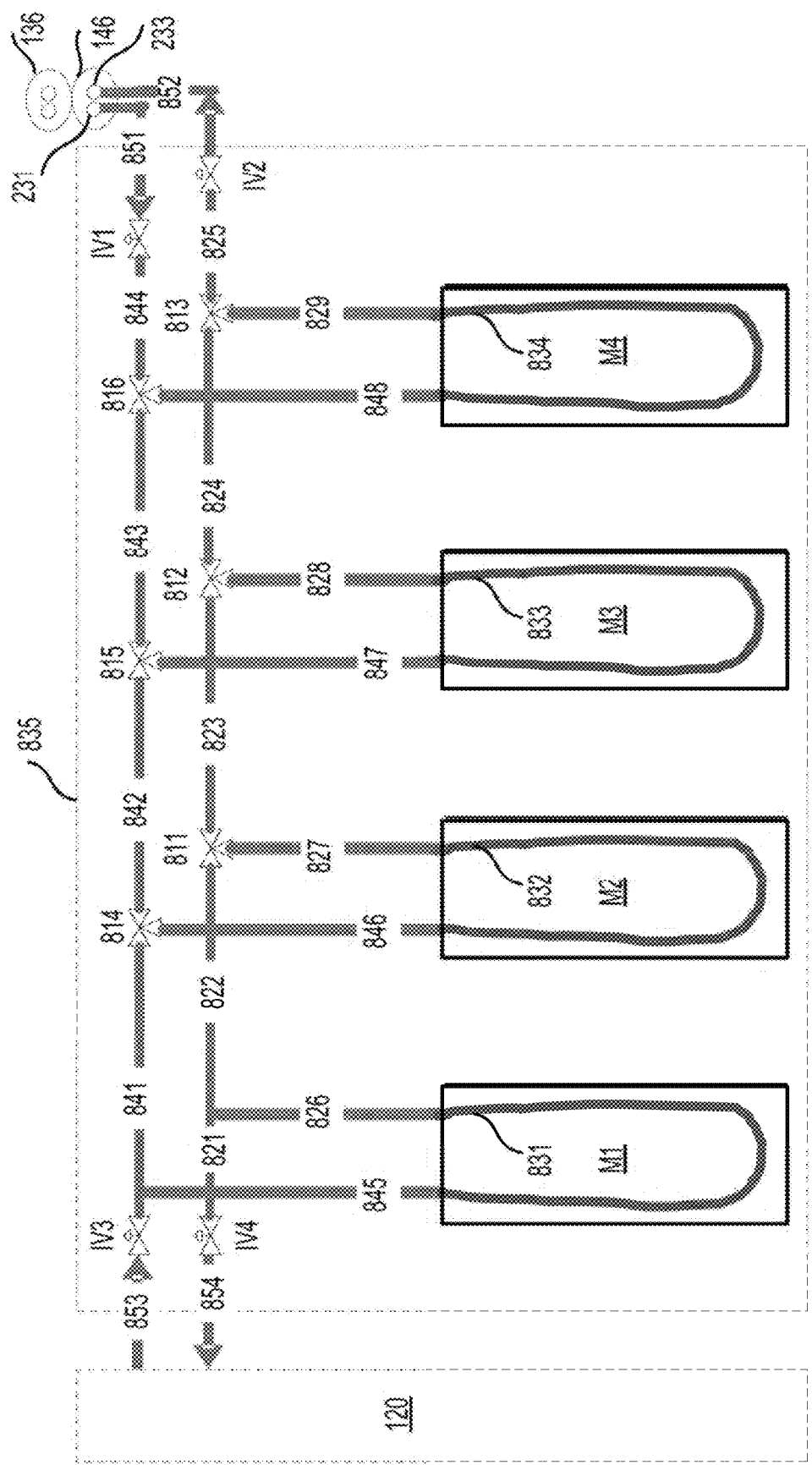
FIGS. 8-10 show examples of the battery pack including multiple battery modules according to the present disclosure.
Figure 9:
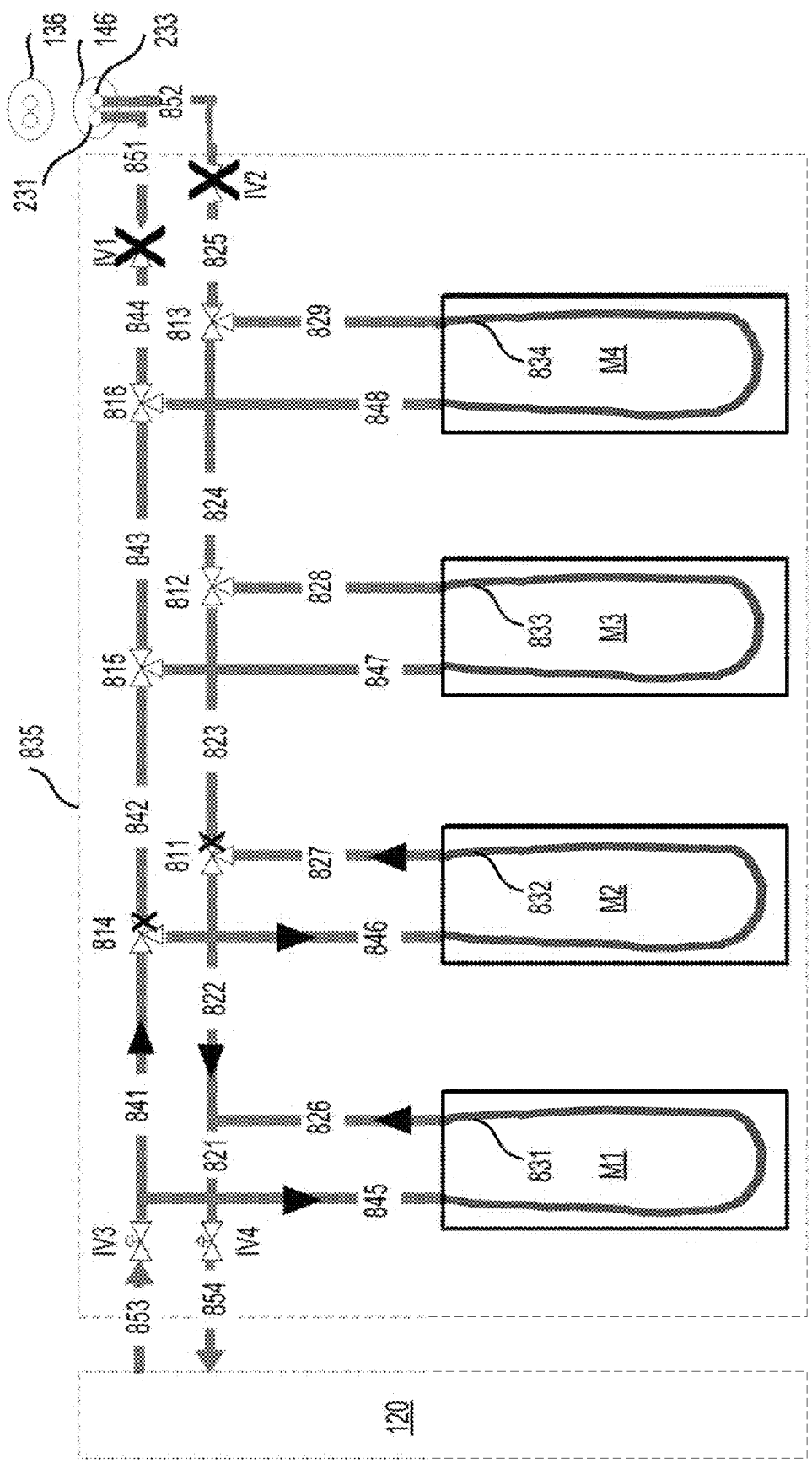
Figure 10:
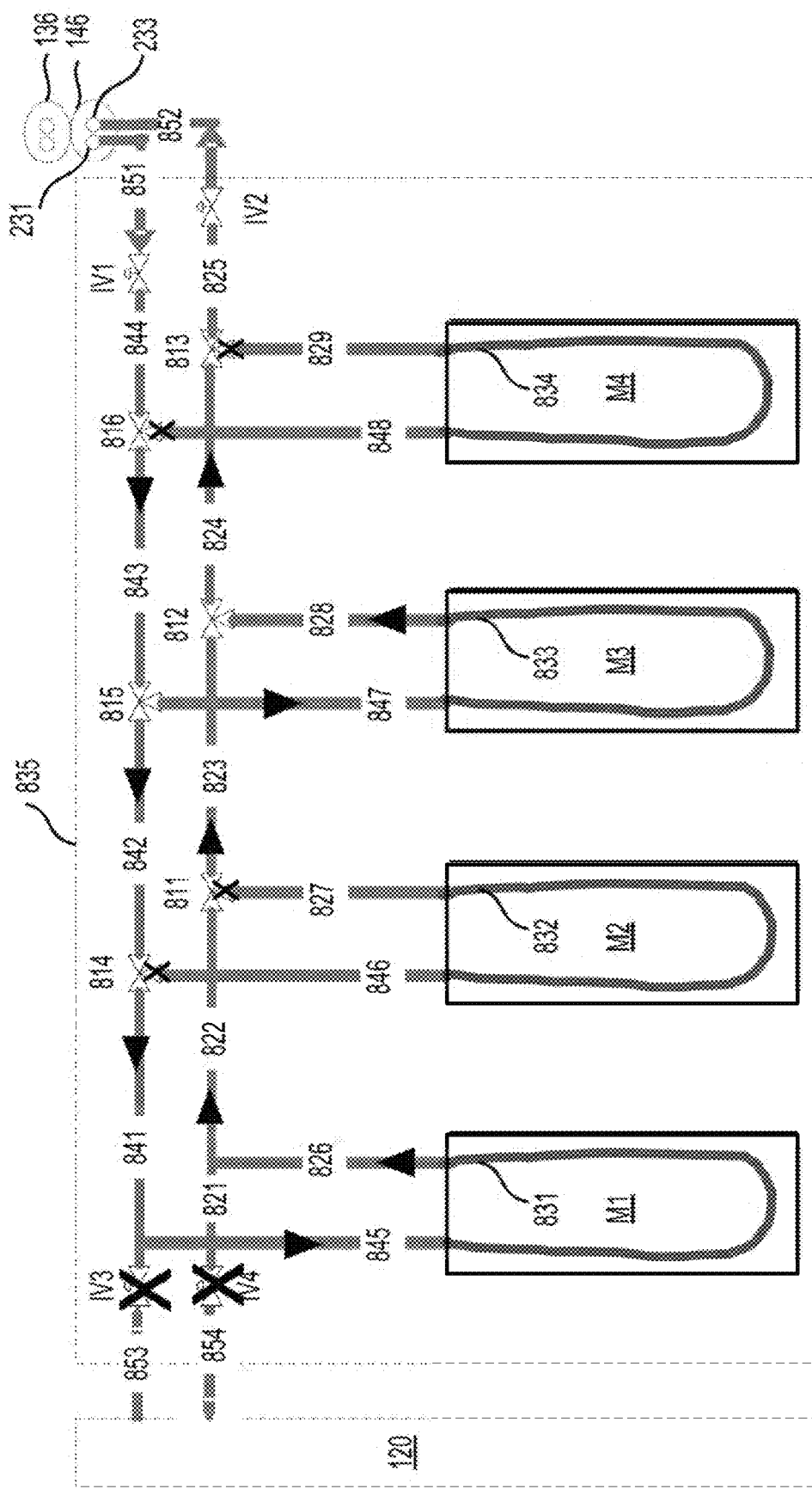

As described above, the battery pack 130 can include multiple battery modules, such as the battery modules Mi-M4, and a subset (e.g., M1, M1 and M2, M1 and M3, or the like) of the multiple battery modules can be cooled. FIGS. 8-10 show examples of a cooling circuit 835 that includes the module activation valves 811-816 according to the present disclosure. The cooling circuit 835 can be an example of the shared cooling circuit 135 described with reference to FIGS. 3A, 3B, and 4.

Referring to FIG. 8, the battery pack 130 can include the battery modules M1-M4 and the cooling circuit 835. The cooling circuit 835 can include conduits 831-834 in the respective battery modules M1-M4, connectors (e.g., 821-829, 841-848, 851-854), the module activation valves 811-816, and the isolating devices IV1-IV4. The cooling circuit 835 can be connected to the internal cooling device 120 via connectors 853-854 and the isolating devices IV3-IV4. The cooling circuit 835 can be connected to the external cooling device 102 via connectors 851-852, the isolating devices IV1-IV2, the second cooling interface 146, and the first cooling interface 136. The isolating devices IV1-IV4 can be identical to those described in FIGS. 3A, 3B, and 4, and thus detailed descriptions are omitted for purposes of brevity.

In an example, the isolating devices IV I-IV2 are in the open state, the isolating devices IV3-IV4 are in the closed state, the first cooling interface 136 is mated to the second cooling interface 146, and thus the cooling circuit 835 is connected to the external cooling device 102. In some embodiments, a subset of the conduits 831-834 can be selected by suitably configuring the connectors 821-829 and 841-848, and thus a subset of the battery modules M1-M4 can be cooled, as described in FIGS. 9-10. The subset of the conduits 831-834 can include one or multiple (e.g., 2, 3, or 4) of the conduits 831-834. Further, the multiple of the conduits 831-834 can be adjacent or not adjacent to each other.

Referring to FIG. 9, the isolating devices IV1-IV2 are in the closed state (as indicated by labels 'X'), the isolating devices IV3-IV4 are in the open state, the first cooling interface 136 is disconnected from the second cooling interface 146, and thus the cooling circuit 835 is connected to the internal cooling device 120. Further, the module activation valves 811 and 814 are configured as below: the module activation valve 811 is closed to the connector 823 and is open to the connectors 822 and 827. The module activation valve 814 is closed to the connector 842 and is open to the connectors 841 and 846. Accordingly, the conduits 831-832 are selected to cool the battery modules M1-M2 via the internal cooling device 120. The conduits 833-834 are disconnected from the internal cooling device 120, and the battery modules M3-M4 are not cooled.

In an example, the coolant having a relatively low temperature enters the cooling circuit 835 from IV3. Subsequently, a first portion of the coolant goes through the connector 845, the conduit 831, and the connector 826 before returning to the internal cooling device 120 via the connector 821, IV4, and the connector 854. A second portion of the coolant goes through the connector 841, and is directed by the module activation valve 814 to the connector 846, the conduit 832, and the connector 827. Further, the second portion is routed by the module activation valve 811 to the connectors 822 and 821, IV4, and the connector 854. A temperature of the coolant at the connector 854 can be higher than a temperature of the coolant at the connector 853. Flow directions of the coolant, the first portion, and the second portion are marked by arrows in FIG. 9. The conduits 831-832 are adjacent to each other.

In an example shown in FIG. 9, the conduits 83-834 are disconnected from the internal cooling device 120 and the external cooling device 102. Any available configurations can be used for the module activation valves 812, 813, 815, and 816.

Referring to FIG. 10, the isolating devices IV1-IV2 are in the open state, the isolating devices IV3-IV4 are in the closed state (as indicated by labels X), the first cooling interface 136 is connected to the second cooling interface 146, and thus the cooling circuit 835 is connected to the external cooling device 102. Further, the module activation valves 811 and 814 are configured as below: the module activation valve 811 is closed to the connector 827 and is open to the connectors 822-823. The module activation valve 814 is closed to the connector 846 and is open to the connectors 841-842. Thus the conduit 832 is isolated. The module activation valves 813 and 816 are configured as below: the module activation valve 813 is closed to the connector 829 and is open to the connectors 824-825. The module activation valve 816 is closed to the connector 848 and is open to the connectors 843-844. Thus the conduit 834 is isolated. The modulation activation valves 812 and 815 are configured as below: the module activation valve 812 is open to the connectors 823, 824, and 828. The module activation valve 815 is open to the connectors 842, 843, and 847. Accordingly, the conduits 831 and 833 are selected to cool the battery modules M1 and M3 via the external cooling device 102. The conduits 832 and 834 are disconnected from the external cooling device 102, and the battery modules M2 and M4 are not cooled.

In an example, the coolant having a relatively low temperature enters the cooling circuit 835 from the inlet port 231. The coolant then goes through the connector 851, IV1, the connector 844, the module activation valve 816, and the connector 843. Subsequently, a first portion of the coolant goes through the module activation valve 815, the connector 842, the module activation valve 814, the connectors 841 and 845 and reaches the conduit 831. The first portion then goes through the conduit 831, passes the connectors 826 and 822, the module activation valve 811, and the connector 823 before reaching the module activation valve 812. A second portion of the coolant emerges from the module activation valve 815, goes through the connector 847, the conduit 833, the connector 828, and returns to the module activation valve 812. The first portion and the second portion can be combined by the module activation valve 812 into the coolant. The coolant then passes through the connector 824, the module activation valve 813, the connector 825, IV2, and the connector 852 before returning to the output outlet 233 and the external cooling device 102. A temperature of the coolant at the connector 852 can be higher than a temperature of the coolant at the connector 851. Flow directions of the coolant, the first portion, and the second portion are marked by arrows in FIG. 10. The cooling sections 831 and 833 are not adjacent to each other.

The cooling circuit 835 can be suitably adapted to select any subset of the conduits 831-834, and thus cool the respective subset of the battery modules M1-M4. The cooling circuit 835 can include additional component(s) or omit certain components. In an example, module activation valve(s) are added to isolate the conduit 831. The module activation valves 813 and 816 can be removed. The components in the cooling circuit 835 can be positioned in any suitable locations.

The cooling circuit 835 can be adapted to be an example of the dedicated cooling circuit 545 described with reference to FIGS. 5-6, for example, by removing the isolating devices IV1-IV4. The cooling circuit 835 can be adapted to bean example of the second cooling circuit 535 described with reference to FIGS. 5-6, for example, by removing the isolating devices IV1-IV4.

Figure 11:
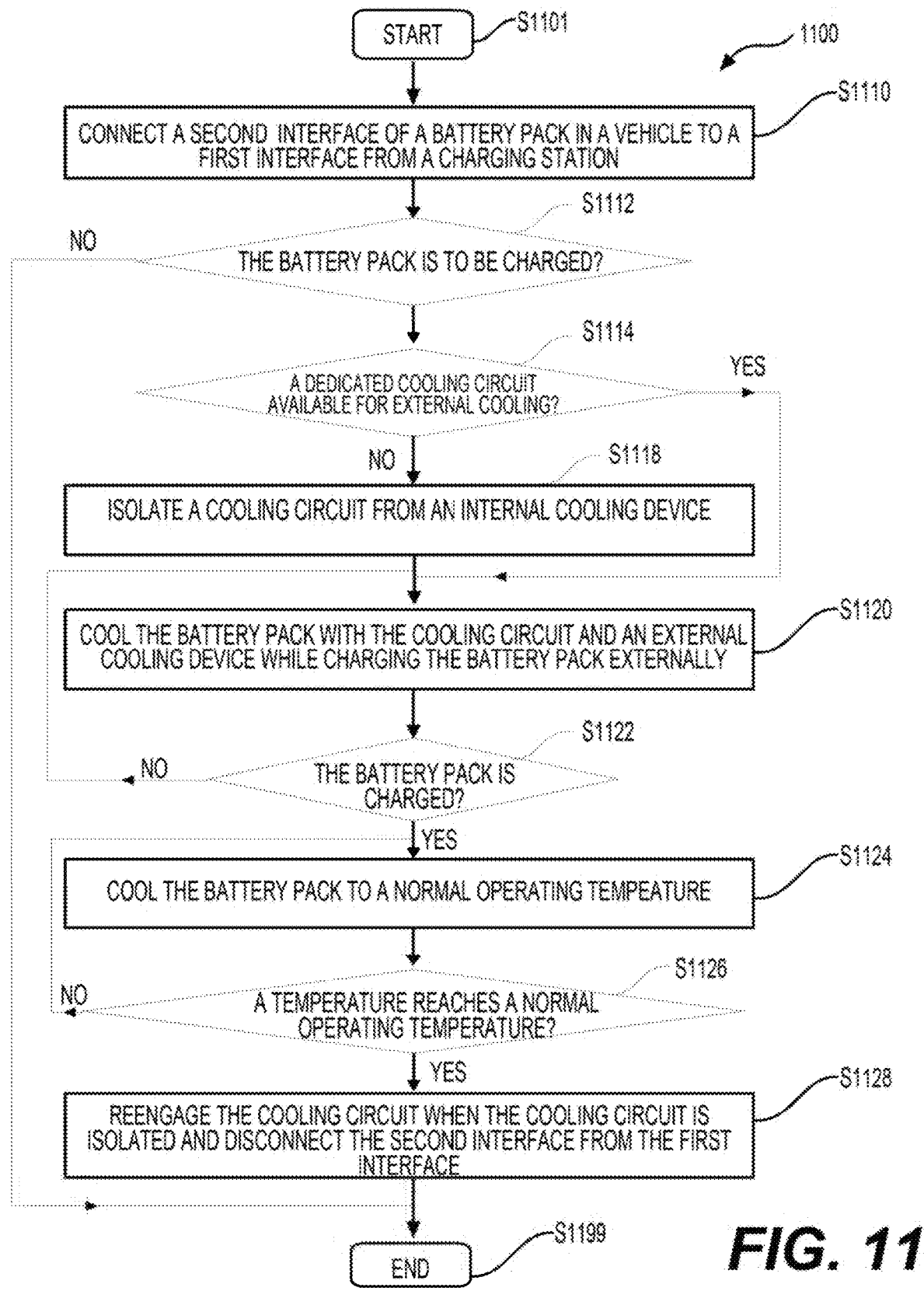
FIG. 11 is a flow chart illustrating a process 1100 according to the present disclosure.

FIG. 11 is a flowchart outlining an exemplary process 1100 according to the present disclosure. The process 1100 can be used to cool a battery pack (e.g., the battery pack 130) in a vehicle, one or more battery modules in the battery pack, or the like, for example, when the battery pack or the one or more battery modules are being charged (e.g., via AC charging, via DC charging, such as a fast DC charging) externally at a charging station. The process 1100 starts at S1101 and proceeds to S1110.

At S1110, a second interface (e.g., the second interface 126) of the battery pack in the vehicle can be connected to (or engaged with) a first interface (e.g., the first interface 116) from an external charging device, for example, of a charging station, as described above. The second interface of the battery pack can include a charging port (e.g., the charging port 226) and a second cooling interface (e.g., the second cooling interface 146). The first interface from the external charging device can include a charging plug and a first cooling interface (e.g., the first cooling interface 136). The charging port is mated to (or engaged with) the charging plug (e.g., an AC socket in the charging port is mated to an AC plug in the charging plug, a DC socket in the charging port is mated to a DC plug in the charging plug, or the like). As described above with reference to FIG. 2, the charging port can be a standard charging socket and is compatible with the charging plug at the charging station.

The second cooling interface is mated to the first cooling interface. For example, QD leakless fittings, such as high pressure QD leakless fittings, of the second cooling interface are connected to those of the first cooling interface to form QD leakless connections for cooling. In an example, a second communication interface on the second interface is connected (e.g., via wired connection, or wirelessly) to a first communication interface on the first interface. In some examples, the charging port and the second cooling interface can be integrated into a charging port assembly (e.g., the charging port assembly 216).

The second interface, the charging port assembly, the charging port, the second cooling interface, the second communication interface, the first interface, the first cooling interface, the charging plug, the first communication interface, and/or the like can be identical to those described in FIGS. 1, 2A, and 2B, and thus detailed descriptions are omitted for purposes of brevity.

At S1112, whether to charge the battery pack (or whether the battery pack needs to be charged) can be determined, for example, by a controller (e.g., a BMS, a BCM) in the vehicle, as described above. The controller in the vehicle can be referred to as a vehicle controller and can monitor and indicate a charging status (or a battery level, a SoC) of the battery pack. In an example, when the SoC is below a certain threshold, the battery pack needs to be charged.

In an example, the battery pack includes multiple battery modules that can be monitored and charged individually. When one or more SoCs of one or more of the multiple battery modules are below a certain threshold, the vehicle controller can determine that the one or more of the multiple battery modules are to be charged, and remaining battery module(s) in the battery pack do not need to be charged.

The vehicle controller can be located in any suitable location in the vehicle (e.g., in the battery pack, outside the battery pack), and approves or disapproves the charging process. The vehicle controller can also be distributed in the battery modules. When the battery pack (or the one or more of the multiple battery modules) needs to be charged, the process 1100 proceeds to S1114. When the battery pack does not need to be charged or none of the multiple battery modules needs to be charged, the process 1100 proceeds to S1199 and terminates.

At S1114, whether a dedicated cooling circuit is available to cool the battery pack, for example, externally can be determined. When the dedicated cooling circuit is determined to be available to cool the battery pack externally, the process 1100 proceeds to S1120. In an example, when the dedicated cooling circuit is determined to be available in the battery pack, the dedicated cooling circuit can be selected to be the cooling circuit to use to cool the battery pack externally. Otherwise, the process 1100 proceeds to S1118. In an example, the battery pack includes two separate cooling circuits (e.g., the cooling circuits 535 and 545 in FIGS. 5-7), where one of the cooling circuits (e.g., the cooling circuit 545) is the dedicated cooling circuit that is dedicated to be connected to the external cooling device, and thus the dedicated cooling circuit (e.g., the cooling circuit 545) is determined to be available to cool the battery pack externally. In an example, the battery pack includes a cooling circuit (e.g., the cooling circuit 135 as shown in FIGS. 3A, 3B, and 4) that can be shared by the external cooling device and the internal cooling device, and thus the dedicated cooling circuit is determined not to be available.

At S1118, the cooling circuit can be isolated from the internal cooling device, for example, as described above with reference to FIG. 3B. Referring to FIG. 3B, the isolating valves IV3-IV4 are configured to be in the closed state to isolate the cooling circuit (e.g., the shared cooling circuit 135) from the internal cooling device 120. In an example, S1118 is performed by the vehicle controller.

At S1120, the battery pack can be charged and cooled with the cooling circuit and the external cooling device. The cooling circuit can be the shared cooling circuit (e.g., the shared cooling circuit 135) or the dedicated cooling circuit (e.g., the cooling circuit 545), and the cooling circuit is connected to the external cooling device. In an example, a controller (or external controller) at the charging station communicates with the vehicle controller (e.g., via the first and second communication interfaces), and initiates the charging process (e.g., the charging process can include charging and cooling the battery pack) when the vehicle controller approves the charging process.

A coolant can be circulated in the cooling circuit and the external cooling device at a first flow rate. The first flow rate can be controlled to maintain an optimum charging temperature for the battery pack. The optimum charging temperature can be any suitable temperature or within any suitable temperature range. In an example, the optimum charging temperature is an optimum fast charging temperature for fast DC charging. When a temperature of the battery pack is above a certain threshold (e.g., a first temperature threshold), the first flow rate can be increased to cool the battery pack faster. When the temperature of the battery pack is below a certain threshold (e.g., a second temperature threshold), the first flow rate can be decreased. When the temperature of the battery pack is at the optimum charging temperature or within a certain temperature range, the first flow rate can remain the same. In an example, various information (e.g., temperature information of the temperature of the battery pack, SoC information indicating the SoC of the battery) is received by the charging station (e.g., the external controller, the controller 117) via the first and second communication interfaces from the vehicle controller, and the charging station (e.g., the external controller, the controller 117) can control (e.g., adjust) the first flow rate based on the various information (e.g., the temperature information and/or the SoC information).

As described above with reference to FIGS. 4 and 7, the battery pack can be cooled with the internal cooling device, for example, during operation of the vehicle. The coolant can also be circulated in a cooling circuit (e.g., the shared cooling circuit 135, the cooling circuit 535) in the battery pack and the internal cooling device at a second flow rate. In an example, the first flow rate that an external pump (e.g., P2) is capable of is larger than the second flow rate, and thus the battery pack can be cooled at a faster flow rate. The external cooling device can remove heat more efficiently than the internal cooling device, for example, by using the faster flow rate. Accordingly, using external cooling can result in better control over the temperature of the battery pack during charging (e.g., fast charging) and can result in the optimum charging temperature. Maintaining the optimum charging temperature can be important to reduce battery cell degradation during charging (e.g., fast charging), and can reduce a total charging time. Further, cooling the battery pack with the internal cooling device can result in battery usage (or onboard electrical usage) of the battery pack as energy is used to operate a pump (e.g., P1) in the internal cooling device to circulate the coolant. On the other hand, cooling the battery pack with the external cooling device using the external pump (e.g., P2) can avoid the battery usage (or the onboard electrical usage) of the battery pack, thus increasing charging efficiency (e.g., reducing a load on the battery pack and decreasing the charging time).

At S1122, whether the battery pack is charged can be determined, for example, by the vehicle controller (e.g., BCM). The vehicle controller can monitor and indicate the charging status (or the battery level, the SoC) of the battery pack. In an example, when the SoC is above or reach a threshold (e.g., an SoC threshold), the vehicle controller determines that the battery pack is charged. When the certain threshold is 100% of the battery level, the vehicle controller determines that the battery pack is fully charged. As described above, the one or more of the multiple battery modules can be charged individually. When the one or more SoCs are above or reach a certain threshold, the vehicle controller determines that the one or more of the multiple battery modules are charged. When the vehicle controller determines that the battery pack or the one or more of the multiple battery modules are charged, the process 1100 proceeds to S1124. Otherwise, the process 1100 returns to S1120.

At S1124, the battery pack can be cooled to a normal operating temperature, for example, while not being charged. In an example, the optimum charging temperature is higher than the normal operating temperature, and thus the battery pack is cooled using the external cooling device while not being charged. A flow rate in the cooling circuit can be identical to or smaller than the first flow rate. The flow rate can be controlled (e.g., adjusted) by the external controller (e.g., the controller 117).

At S1126, whether the temperature of the battery pack reaches the normal operating temperature can be determined, for example, by the vehicle controller. When the temperature of the battery pack is determined to reach the normal operating temperature, the coolant circulation can be stopped, for example, by the external controller. The process 1100 proceeds to S1128. Otherwise, the process 1100 proceeds to S1124.

At S1128, the second interface is disconnected from the first interface. The vehicle controller can confirm with the external controller that the charging process is completed. The charging port can be disconnected from the charging plug, and the second cooling interface can be disconnected from the first cooling interface. Alternatively, the entire charging port assembly is disconnected from the first interface.

In an example, when the cooling circuit is the shared cooling circuit, the cooling circuit is reengaged, for example, by the vehicle controller to the internal cooling device, for example, by configuring the isolating valves IV1-IV4. For example, the isolating valves IV1-IV2 are configured to be in the closed state and the isolating valves IV3-IV4 are configured to be in the open state. The process 1100 proceeds to S1199 and terminates. Subsequently, the vehicle controller can confirm with the external controller that the charging process is completed.

The process 1100 can be suitably adapted. For example, certain step(s) can be omitted or combined. Additional step(s) can be added. A sequence of the steps can be adapted.

In an example, steps S1122, S1124, and S1126 can be combined to determine whether the charging process is completed. In an example, a criterion for completing the charging process includes 1) the battery pack is charged (e.g., the SoC is above or reaches the SoC threshold) and 2) the temperature of the battery pack reaches the normal operating temperature.

When certain information is known to the controller, certain steps can be omitted. For example, when it is known in advance that no dedicated cooling circuit is available, S1114 is omitted, and S1118 is implemented after S1112.

As described above, steps in the process 1100 can be performed by the vehicle controller in the vehicle and/or the external controller in the charging station. In general, various sensor(s) are used in the vehicle (e.g., the battery pack, the internal cooling device) and in the charging station (e.g., the external charging device). Information obtained using the sensor(s) can be shared via the first and second communication interfaces (e.g., using wired and/or wireless communication technologies). Certain step(s) performed by the vehicle controller can also be performed by the external controller. Certain step(s) performed by the external controller can also be performed by the vehicle controller.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of charging a battery pack in a vehicle, comprising:
   connecting a first interface in an external charging device to a second interface of the battery pack, the second interface including a second cooling interface to cool the battery pack via an external cooling device in the external charging device and a charging port to charge the battery pack via the external charging device;
   when charging the battery pack via the external charging device, circulating coolant in a cooling circuit in the battery pack using the external cooling device, the cooling circuit being connected to the external cooling device via a first cooling interface in the external cooling device and the second cooling interface; and
   disconnecting the first interface from the second interface when a charging process is completed,
   wherein the method further comprises:
   determining whether a dedicated cooling circuit is available in the battery pack to cool the battery pack via the external cooling device;
   when the dedicated cooling circuit is determined to be available in the battery pack, selecting the dedicated cooling circuit to be the cooling circuit; and
   when the dedicated cooling circuit is determined not to be available in the battery pack and before circulating the coolant in the cooling circuit, isolating the cooling circuit from an internal cooling device in the vehicle and connecting the cooling circuit to the second cooling interface by configuring a plurality of isolating devices; and when the charging process is completed, reconnecting the cooling circuit to the internal cooling device and isolating the cooling circuit from the external cooling device by reconfiguring the plurality of isolating devices.

2. The method of claim 1, wherein the charging port and the second cooling interface are integrated into a charging port assembly.

3. The method of claim 2, wherein the second cooling interface has an inlet port and an outlet port that have leakless fittings.

4. The method of claim 1, wherein the charging port further comprises a direct current (DC) socket configured to charge the battery pack externally.

5. The method of claim 1, further comprising:
   determining whether a dedicated cooling circuit is available in the battery pack to cool the battery pack via the external cooling device; and
   when the dedicated cooling circuit is determined to be available in the battery pack, selecting the dedicated cooling circuit to be the cooling circuit.

6. The method of claim 1, wherein the battery pack includes multiple battery modules:
   the cooling circuit includes multiple conduits for the respective multiple battery modules and a plurality of module activation valves;
   charging the battery pack includes charging a subset of the multiple battery modules; and
   circulating the coolant includes configuring the plurality of module activation valves to circulate the coolant in a subset of the conduits to cool the subset of the multiple battery modules.

7. The method of claim 1, wherein circulating the coolant in the cooling circuit comprises:
   measuring a temperature of the battery pack;
   determining a flow rate for the coolant based on the temperature; and
   circulating the coolant at the determined flow rate.

8. The method of claim 7, wherein determining the flow rate for the coolant comprises:
   measuring a state of charge (SoC) of the battery pack; and
   determining the flow rate for the coolant based on the temperature and the SoC.

* * * * *